(12) United States Patent
Kaleedhass

(10) Patent No.: US 7,596,245 B2
(45) Date of Patent: Sep. 29, 2009

(54) PROCESS OF STORAGE OF BIOMETRIC FEATURES

(75) Inventor: Karthik Kaleedhass, Selangor (MY)

(73) Assignee: Multimedia Glory SDN. BHD., Kuala Lumpur (MY)

( * ) Notice: Subject to any disclaimer, the term of this patent is extended or adjusted under 35 U.S.C. 154(b) by 692 days.

(21) Appl. No.: 10/902,833

(22) Filed: Aug. 2, 2004

(65) Prior Publication Data

US 2005/0041876 A1 Feb. 24, 2005

(30) Foreign Application Priority Data

Aug. 1, 2003 (MY) .............................. PI 2003 2931

(51) Int. Cl.
*G06K 9/00* (2006.01)
(52) U.S. Cl. ........................ 382/115; 382/173; 382/124; 382/117
(58) Field of Classification Search ......... 382/115–127, 382/243, 124
See application file for complete search history.

(56) References Cited

U.S. PATENT DOCUMENTS

| | | | | | |
|---|---|---|---|---|---|
| 4,049,913 | A | * | 9/1977 | Sakoe | 704/241 |
| 4,817,183 | A | * | 3/1989 | Sparrow | 382/125 |
| 4,947,443 | A | * | 8/1990 | Costello | 382/125 |
| 5,040,224 | A | * | 8/1991 | Hara | 382/124 |
| 5,261,008 | A | * | 11/1993 | Yamamoto | 382/127 |
| 5,321,765 | A | * | 6/1994 | Costello | 382/125 |
| 5,717,777 | A | * | 2/1998 | Wong et al. | 382/124 |
| 5,802,205 | A | * | 9/1998 | Emico et al. | 382/187 |
| 5,848,176 | A | * | 12/1998 | Hara et al. | 382/124 |
| 6,002,784 | A | * | 12/1999 | Sato | 382/124 |
| 6,049,621 | A | * | 4/2000 | Jain et al. | 382/125 |
| 6,185,318 | B1 | * | 2/2001 | Jain et al. | 382/125 |
| 6,229,905 | B1 | * | 5/2001 | Suzaki | 382/110 |
| 6,241,288 | B1 | * | 6/2001 | Bergenek et al. | 283/67 |
| 6,285,780 | B1 | * | 9/2001 | Yamakita et al. | 382/110 |
| 6,580,814 | B1 | * | 6/2003 | Ittycheriah et al. | 382/115 |
| 7,233,685 | B2 | * | 6/2007 | Miyasaka et al. | 382/124 |
| 7,391,890 | B2 | * | 6/2008 | Kaleedhass | 382/124 |
| 7,457,442 | B2 | * | 11/2008 | Mimura et al. | 382/124 |
| 2002/0018585 | A1 | * | 2/2002 | Kim | 382/125 |
| 2002/0150283 | A1 | * | 10/2002 | Mimura et al. | 382/124 |

(Continued)

*Primary Examiner*—Matthew C. Bella
*Assistant Examiner*—Sath V. Perungavoor
(74) *Attorney, Agent, or Firm*—Birch, Stewart, Kolasch & Birch, LLP

(57) ABSTRACT

The invention discloses a process of recoding biometric features in recordable medium comprising several steps. Raw biometrics feature such as finger prints, palm prints, iris image, retina image and other biometrics feature or a combination thereof are extracted. The raw biometrics feature is segmented into at least two segment units. Anchor features and at least two other significant features in each segment are identified.

The anchor feature consists of centre point in finger prints or palm prints, optic disc in retina image or lens section in iris image. The significant features consist of ridge join points, ridge line endings for finger prints or palm prints and macula and vessel density in retina, and lens and iris portion in iris image.

The relativity in position of each significant feature in relation to the anchor feature is computed. The relativity includes one or more of the following; distance, direction or segments units. The minimum and maximum value of the relativity of each feature is computed. The values obtained in steps (iv) and (v) or in combination as feature are concatenated. Feature obtained in step (vi) are stored.

9 Claims, 3 Drawing Sheets

U.S. PATENT DOCUMENTS

| | | | |
|---|---|---|---|
| 2003/0223625 A1* | 12/2003 | Hillhouse et al. | 382/125 |
| 2004/0096086 A1* | 5/2004 | Miyasaka et al. | 382/124 |
| 2004/0234111 A1* | 11/2004 | Mueller | 382/124 |
| 2005/0058324 A1* | 3/2005 | Karthik | 382/115 |
| 2006/0050937 A1* | 3/2006 | Hamid | 382/124 |
| 2006/0159316 A1* | 7/2006 | Chisamore et al. | 382/125 |
| 2007/0206841 A1* | 9/2007 | Hamid | 382/124 |
| 2008/0219521 A1* | 9/2008 | Benkley et al. | 382/124 |

* cited by examiner

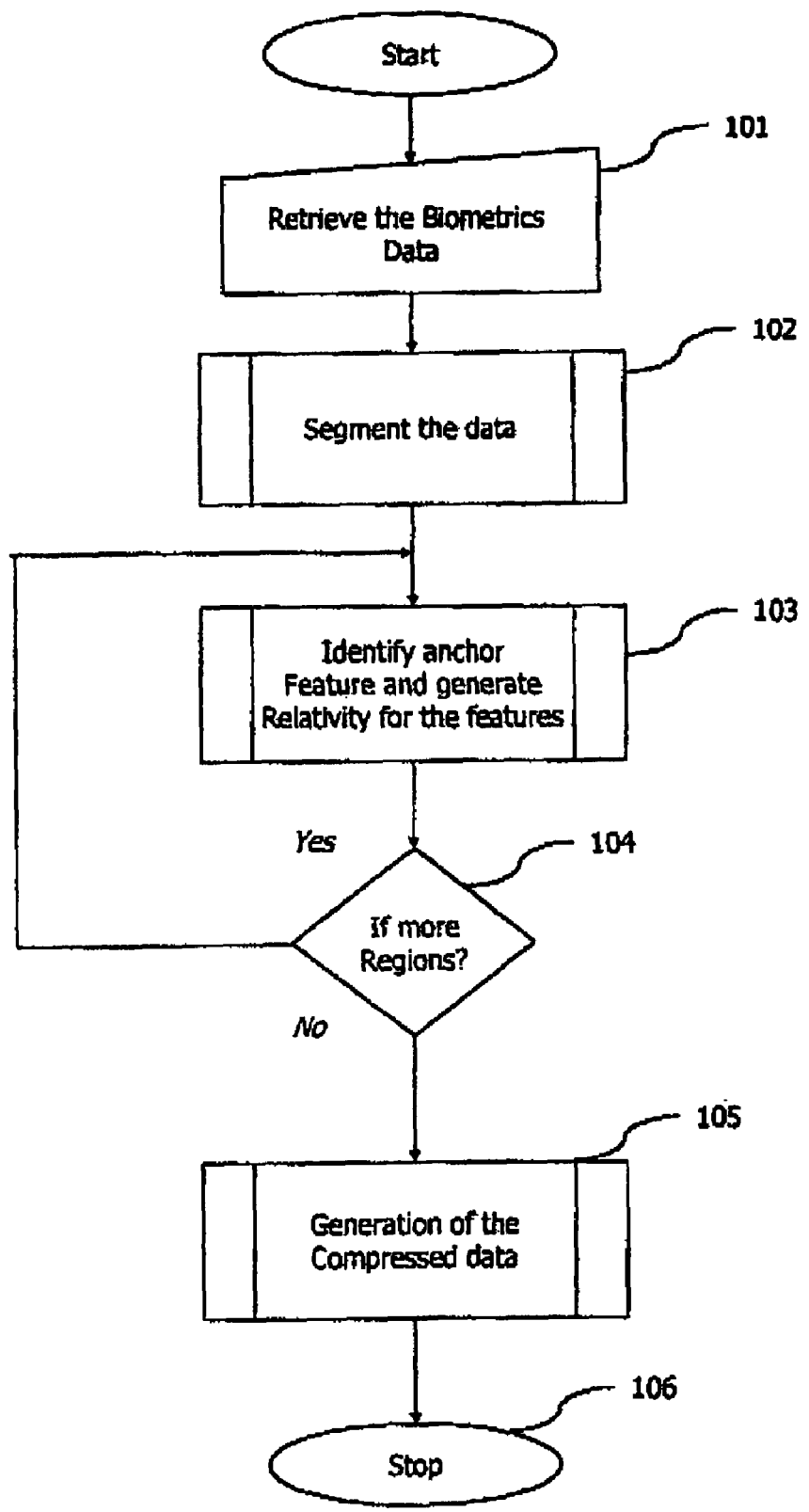

PROCESS OF STORAGE OF BIOMETRIC FEATURES

This Nonprovisional application claims priority under 35 U.S.C. § 119(a) on Patent Application No(s). PI 2003 2931 filed in Malaysia on Aug. 1, 2003, the entire contents of which are hereby incorporated by reference.

The invention generally relates to a method of processing biometric features to reduce electronic storage space required to store the biometric features.

The biometric features include but not limited to fingerprint, DNA, iris, retina, tissue and other features unique to an individual. More particularly the invention relates to a method of processing biometric features for electronic storage and to facilitate rapid comparison with a present biometric feature.

Various types of biometrics features as fingerprint, iris, and retina are used for identification and verification of individuals. The biometric features are extracted from raw data such as fingerprint images in case of fingerprint, iris images in case of Iris and retinal images for retina based biometrics identification and authentication systems.

The extraction of biometric features from the raw data is carried out using feature extraction algorithm as disclosed in prior art.

The biometric features contain individualistic characteristics of the biometrics raw data that is used for verification. For example, in case of fingerprint the information on the individual characteristics of the fingerprint image includes, but is not limited to:
(i) core points;
(ii) ridge join points; and
(iii) ridge line ending points The individual characteristics of the features have unique individual properties such as:
(i) direction;
(ii) angle; and
(iii) relativity and other features The above listed properties and the characteristics are applicable for fingerprint. But in case verification using the retina, the characteristics include but are not limited to:
(i) optical nerve core;
(ii) ecudate density; and
(iii) optical disc-eye ratio As stated for the biometrics types above, the characteristics vary for different types of biometrics and the extraction and recognition of the characteristics are disclosed in prior art documents.

The characteristics and their respective properties biometrics are referred in this description as "biometrics data". The biometrics data must be able to be stored electronically into a database and also be retrievable when required, for identification and verification.

The storage of the biometrics data in its form requires around 200 bytes or above. This storage space requirement will not be a constraint for limited number of biometrics data. However for large number of biometrics data the 200 bytes or above requirement is a huge space requirement. For example for 100,000 individuals the minimum quantity of bytes required is 200×100,000=20,000,000 bytes.

This storage space requirement is also a constraint in embedded environment where the biometrics technology is intended to be used such as smart card, and other prior art technologies as the space available for storage is limited.

It should be highlighted that compression technology and other prior art technologies that is commonly used cannot be used in this environment, as they are not efficient with small amount of data such as 200 bytes. This is because the header information defining the compressed data used during decompression is above 200 bytes; as a result the resultant compressed data will be above 200 bytes.

The Lossy compression technique commonly used in graphical environments such as JPEG compression cannot be used for storage of biometrics data as any loss of data will impact the verification and identification performance.

One of the reasons the compression algorithm is not usable with biometrics data is that the compression is designed for generic data and based on the distribution of bytes within the content. The biometrics data is packed information of data structures used by the biometrics verification and identification algorithm wherein the bytes distribution is already compact.

The packed information includes but is not limited to information describing the biometrics features and its properties.

It is an object of the invention, to overcome such difficulties in compressing the biometrics data. New method that understands and processes the biometrics data to compress its contents that results in efficient data storage of biometrics data is needed.

Another objective is to provide a method that stores global characteristics of the biometrics data for a set of similar data set within the biometrics data. The global characteristics of the biometrics data contain the information required to verify the features.

It is yet another objective of the invention to ensure the important characteristics of the biometrics data are not eliminated during the compression stages that may impact the verification and identification.

In most cases the global characteristics of a set of similar data is created or generated instead of identification and these characteristics are present within the biometrics data.

Another objective of the invention is to provide for a method that verifies two compressed data of the biometrics data to ascertain their similarities.

The invention discloses a process of recoding biometric features in recordable medium comprising several steps. Raw biometrics feature such as finger prints, palm prints, iris image, retina image and other biometrics feature or a combination thereof are extracted. The raw biometrics feature is segmented into at least two segment units. Anchor features and at least two other significant features in each segment are identified.

The anchor feature consists of centre point in finger prints or palm prints, optic disc in retina image or lens section in iris image. The significant features consist of ridge join points, ridge line endings for finger prints or palm prints and macula and vessel density in retina, and lens and iris portion in iris image.

The relativity in position of each significant feature in relation to the anchor feature is computed. The relativity includes one or more of the following; distance, direction or segments units. The minimum and maximum value of the relativity of each feature is computed. The values obtained in steps (iv) and (v) or in combination as feature are concatenated. Feature obtained in step (vi) are stored.

In another aspect the invention discloses a process of recording biometric features in recordable medium without segmentation of the biometrics data. Raw biometrics feature such as finger prints, palm prints, iris image, retina image and other biometrics feature or a combination thereof is extracted. Anchor features and other significant features are identified. The relativity in position of each significant feature in relation to the anchor features is computed the relativity includes one or more of the following; distance, direction or segments units. The minimum and maximum value of the relativity of each feature is computed. The values obtained in steps (iii) and (iv) or in combination are computed. Feature obtained in step (v) are stored.

The invention will be described with reference to preferred embodiments and to the enclosed figures in which:

FIG. 3 is a flow diagram of the process of identification of the global characteristics from the biometrics data set.

With the use of fingerprint, say of a thumb, will be described.

Figure 4:
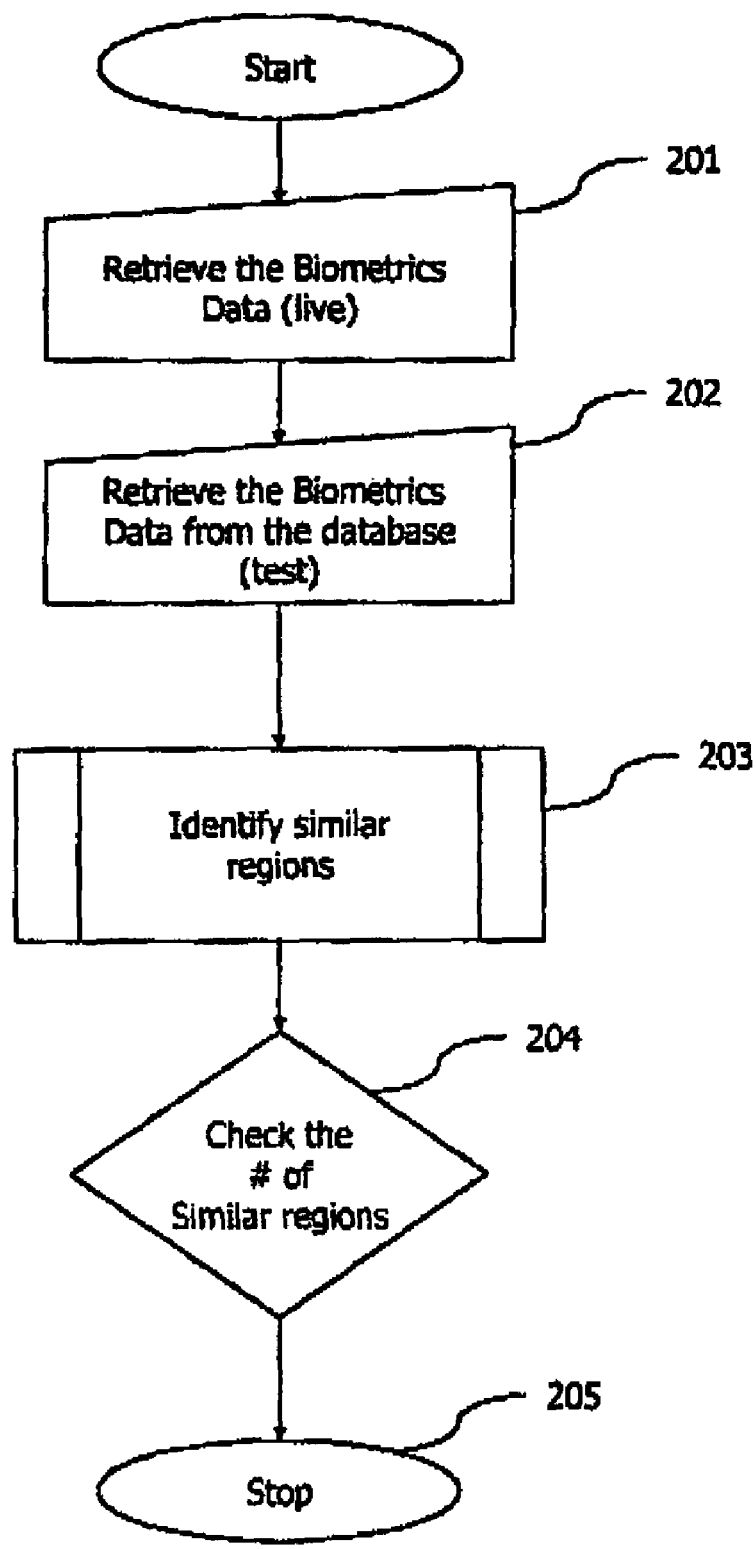
FIG. 4 is a flow diagram of the process of verification of the two compressed generated for check their similarity.

Upon successful retrieval of the biometrics features, the biometrics feature is segmented in regions as shown in FIG. 4

The process requires the biometrics data that is biometrics features extracted from the biometrics raw data obtained from the biometrics acquisition device for example, fingerprint image for fingerprint biometrics type.

Figure 1:
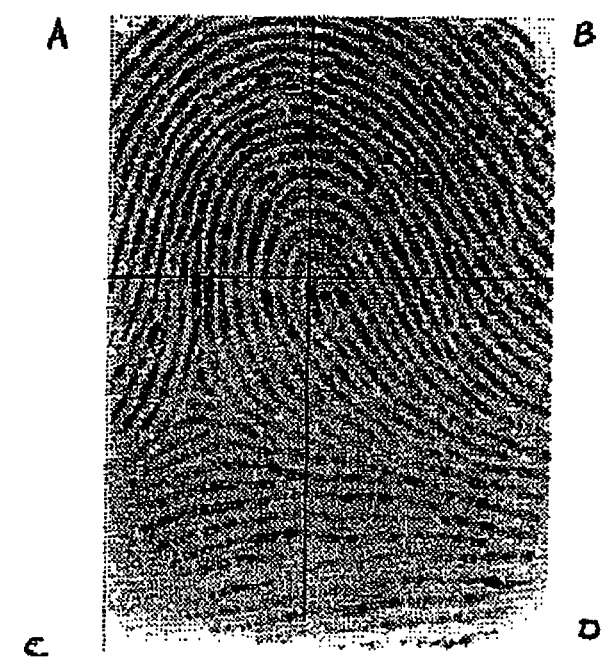
FIG. 1 shows the biometric features of a finger print.

Upon successful retrieval of the biometrics features, the biometrics feature is segmented in regions as shown in FIG. 1

In FIG. 1, the features as indicated in black dots and the biometrics features are separated into 4 regions.

The fingerprint image is shown in the figure only for feature identification. The fingerprint image is not part of the features The four regions can be numbered as A (top-left), B (top-right), C (bottom-left), D (bottom-right).

In region A, there are four features the center feature within this region is selected as indicated by the black rectangle.

In region B, there are six features the center feature within this region is also selected as indicated by black rectangle.

However in region C and D, there is only one feature hence the lone feature cannot be the center feature After processing the regions A, B, C and D, the compressed data is generated as follows:

| Region A: | |
|---|---|
| A - Center Feature number | ex: 5 |
| B - Distance in area between feature 1 and A | ex: 9 |
| C - Distance in area between feature 2 and A | ex: 2 |
| D - Distance in area between feature 3 and A | ex: 6 |
| Region B: | |
| E - Center Feature number | ex: 8 |
| F - Distance in area between feature 1 and A | ex: 9 |
| G - Distance in area between feature 2 and A | ex: 6 |
| H - Distance in area between feature 3 and A | ex: 1 |
| I - Distance in area between feature 4 and A | ex: 3 |
| J - Distance in area between feature 5 and A | ex: 4 |
| In this example Region C and D are ignored. | |

The resultant compressed data will be ABCDEFGHIJ (one byte per character) and based on the above example values, the resultant compressed data will be 5926896134 (every digit occupies one byte and has the minimum value of 0 and maximum value of 127). For this example the space required is only 10 bytes.

Next extraction of biometric data of a retinal image will be described.

As specified in the previous sections, the process requires the biometrics data that is biometrics features extracted from the biometrics raw data obtained from the biometrics acquisition device that is retina image in this example as retina biometrics type is used.

Figure 2:
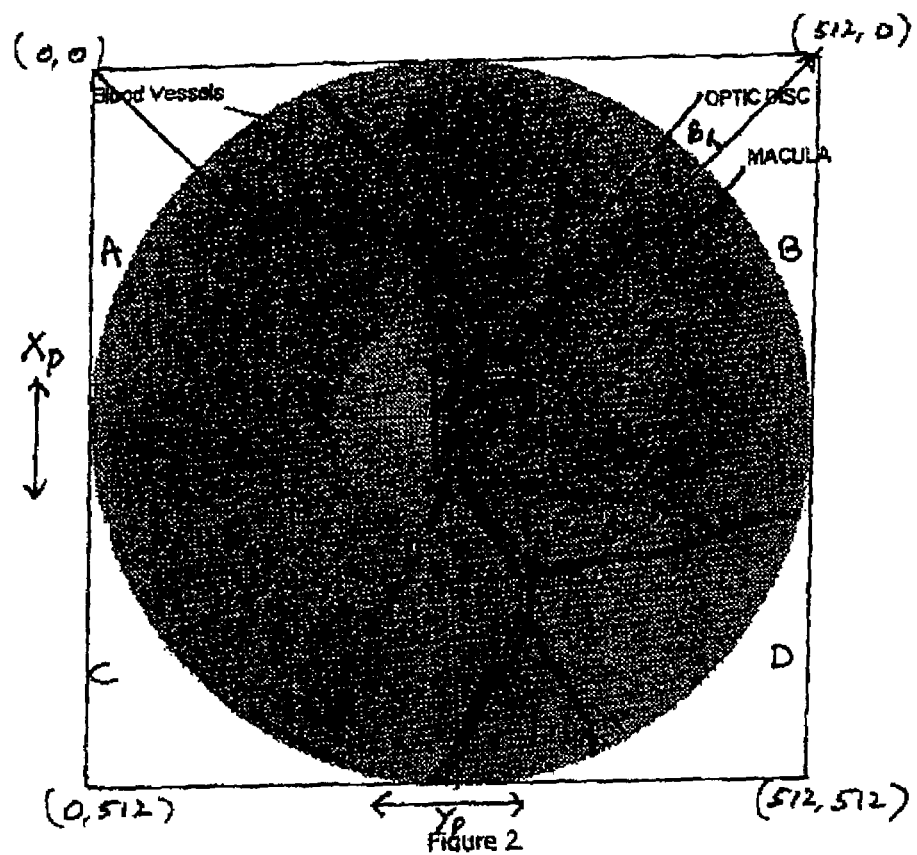
FIG. 2 show the biometric features of an retinal image.

Upon successful retrieval of the biometrics features, the biometrics feature is segmented in regions as shown in FIG. 2.

In FIG. 2, the anchor features and the other significant features are indicated and the biometrics features are separated into 4 regions.

The retinal image is shown in the figure only for feature identification. The retinal image is not part of the features The four regions can be numbered as A (top-left), B (top-right), C (bottom-left), D (bottom-right).

In region A, the relativity in location of the Anchor feature and the other significant features within the region is computed. The relativity in location includes but not limited to distance and/or direction and combination of both. The relativity in location is a value to define the location of a anchor feature or a significant feature within the regions A, B, C and D. The value can be determined by obtaining the positions of X co-ordinate and X co-ordinate of a specific feature (anchor or significant). The method of expressing should be selected based on the least storage requirement. A example of selecting a method of expressing the location of a feature with the least storage requirement is as follows.

The location of a feature can be expressed as the distance apart of a feature from the Xp plane to get the X value and the distance apart of a feature from the Yp plane to get the Y value.

However in the above method of expressing the location of a feature requires two values and the storage requirements for the two values is around two bytes (one for every value) resulting in the need of twice the storage capacity. To reduce the need if an additional storage requirements, the two values (X and Y) that define the location of a feature within the region is reduced to a single value by computing the relation between the X and Y values.

One such method of computing the relation is by directly multiplying the two values to get a single value. For example when the X position of the anchor point within region A is 5 and the Y position of the anchor point within region A is 4, by directly multiplying the values 5 and 4, a single value of 20 is obtained. The value 20 is this case defines the position of the anchor point in terms of area of a rectangle (or a square) that starts from the starting position of the region A i.e. X position 0 and Y position 0 of the actual retina images.

However, other methods can be used to obtain a single value from two values and as available at http://ieee.org.

FIG. 3, is a flow diagram of the process of identification of global characteristics from the biometrics data. This process is an important step in generation of the compress data from the biometrics data as in this process the biometrics data is processed and the global characteristics are identified.

This process requires the biometrics data comprising of biometrics features extracted from the biometrics raw data obtained from the biometrics acquisition device that includes but not limited to finger print scanners for finger print, iris and retinal scanners for retina.

The process starts with step 101 with the retrieval of the biometrics features from the stored database or from other processes that reproduce biometrics features from the biometrics raw data. The method of acquisition, extraction and validation is well know in prior.

Upon successful retrieval of the biometrics features in the step 101, the features are segmented, that is divided into regions dependent on each biometrics such as but not limited to fingerprint, iris, retina, DNA in step 102.

With every region from step 102, in step 103, the anchor feature is identified and the relativity of all other features with the anchor features is extracted. The relativity is any one of the properties prominent in the region. The properties include but not limited to distance in length, angle and distance area.

In step 104, if there are more regions, the process continues from step 103 but when no more regions are available the process continues from step 105.

In step 105, for every region, the minimum and maximum value of properties of the features that describe the relativity with anchor feature is extracted and concatenated resulting the compressed data.

The compressed data from the step 105 can be stored in the database or in the files part of file system for later usage.

The process ends in the step 106.

FIG. 4 is a flow diagram of the process of verification of two compressed data generated for checking their similarity. This process is used for identification and verification of an individual using biometrics This process requires the biometrics data such as biometrics features extracted from the biometrics raw data obtained from the biometrics acquisition device that includes but not limited to finger print scanners for finger print, iris scanners for iris and retinal scanners for retina.

The process starts with step 201 with the retrieval of the biometrics features from the stored database or from other process that output the biometrics features from the biometrics raw data. The method of acquisition, extraction and validation or known prior art.

Upon successful retrieval of the biometrics features in step 201, compressed data is obtained for the biometrics features obtained in step 201. The compress data is obtained using the process in FIG. 1 with the retrieved biometrics features as the input.

In step 202, compressed data stored in the database for the individual is retrieved. The compressed data will be stored with an identifier such as but not limited to generated number, or identity card number.

In step 203, upon successful retrieval of the compressed data in step 202, for every region in the test compressed data from the database (in step 202), the anchor feature and the relativity information is compared with the information in the live compressed data (in the step 201). Exact match checking tests the comparison.

In the step 204, the number of successful matched, is identified and if the value is above the half the number of regions, then the two compressed data is similar and or else they are not.

The process terminates in the step 205.

The significant features include the Blood Vessels, Macula point (circle) and Macula Region. This processing of obtaining the relativity in location is carried out for regions B, C and D After processing the regions A, B, C and D, the compressed data is generated as follows:

| Region A: | |
|---|---|
| A1 - Center/Anchor Feature number | ex: 20 |
| A2 - Location of Macula | ex: 15 |
| A3 - Location of Macula Region | ex: 7 |
| A4 - Location of Blood Vessels | ex: 21 |
| Region B: | |
| B1 - Center/Anchor Feature number | ex: 10 |
| B2 - Location of Macula | ex: 10 |
| B3 - Location of Macula Region | ex: 5 |
| B4 - Location of Blood Vessels | ex: 16 |
| In this example Region C and D are ignored. | |

The resultant compressed data will be ABCDEFGHIJ (one byte per character) and based on the above example values, the resultant compressed data will be 20 15 7 21 10 10 5 16 (every number occupies one byte). For this example the space required is only 10 bytes.

In FIG. 4, the features as indicated in black dots and the biometrics features are separated into 4 regions.

The fingerprint image shown in the figure is only for feature identification. The fingerprint image is not part of the features The four regions can be number as A (top-left), B (top-right), C (bottom-left), D (bottom-right).

In region A, there are four features, the center feature within this region is selected as indicated by the black rectangle.

In region B, there are six features the center feature within this region is also selected as indicated by black rectangle.

However in regions C and D, there is respectively only one feature hence the lone feature cannot be the center feature After processing the regions A, B, C and D, the compressed data is generated as follows:

| Region A: |
|---|
| A - Center Feature number |
| B - Distance in area between feature 1 and A |
| C - Distance in area between feature 2 and A |
| D - Distance in area between feature 3 and A |
| Region B: |
| E - Center Feature number |
| F - Distance in area between feature 1 and A |
| G - Distance in area between feature 2 and A |
| H - Distance in area between feature 3 and A |
| I - Distance in area between feature 4 and A |
| J - Distance in area between feature 5 and A |

In this example Region C and D are ignored.

The resultant compressed data will be ABCDEFGHIJ (one byte per character). For this example the space required is only 10 bytes.

The invention claimed is:

1. A process of recording biometric features in a computer recordable medium to reduce storage space required to store the biometric features, comprising the steps of:

extracting a raw biometrics feature of one or more biometric patterns comprising finger prints, palm prints, iris images, and retina images;

segmenting each one or more raw biometric patterns into at least two regions;

identifying anchor features and at least two other significant features in each of the at least two regions:

wherein the anchor feature consists of:

(a) a centre point in finger prints or palm prints, (b) an optic disc in a retina image, (c) a lens section in an iris image;

and wherein the significant features consist of:

(d) ridge join points or ridge line endings for finger prints or palm prints, (e) macula and vessel density in a retina, and a lens and iris portion in an iris image;

computing positional relativity of each significant feature in relation to the anchor feature wherein the positional relativity includes one or more distance, direction or segment units;

computing the minimum and maximum value of the positional relativity of each feature;

concatenating the values obtained in the computing steps as a feature by compressing the values obtained in the computing steps by one byte per character; and storing in the computer recordable medium of the feature obtained in the immediately preceding step, wherein all of the steps are performed by a computer.

2. A process of recording biometric features in a computer recordable medium to reduce storage space required to store the biometric features, comprising the steps of:

extracting a raw biometrics feature of one or more biometric patterns comprising finger prints, palm prints, iris images, and retina images;

segmenting each one or more raw biometric patterns into at least two regions which are separate from one another;

identifying anchor features and other significant features in each of the at least two separate regions;

computing positional relativity of each significant feature in relation to the anchor features wherein the positional relativity includes one or more of distance, direction or segment units;

computing the minimum and maximum value of the positional relativity of each feature;

concatenating the values obtained in the computing steps as a feature by compressing the values obtained in the computing steps by one byte per character; and storing in the computer recordable medium of the feature obtained the immediately preceding step, wherein all of the steps are performed by a computer.

3. A process of recording biometric features in recordable medium as claimed in claim 1 or claim 2 wherein the feature stored includes data obtained from more than one raw biometric feature.

4. A computer recordable medium which includes a program for performing the process claimed in claim 1.

5. A recordable medium as claimed in claim 1 wherein the medium comprises a hard disk, a smart card, and a smart token.

6. The process of claim 2, further comprising:

comparing a feature stored in the computer recordable medium with test data in a database.

7. The process of claim 1, further comprising:

reducing values that define the location of a feature within a region to a single value.

8. The process of claim 1, wherein the computing positional relativity step is performed for each segmented region.

9. The process of claim 2, wherein the computing positional relativity step is performed for each segmented region.

* * * * *

UNITED STATES PATENT AND TRADEMARK OFFICE
CERTIFICATE OF CORRECTION

PATENT NO.        : 7,596,245 B2
APPLICATION NO.   : 10/902833
DATED             : September 29, 2009
INVENTOR(S)       : Karthik Kaleedhass It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1026 days.

Signed and Sealed this

Twenty-eighth Day of September, 2010

David J. Kappos
*Director of the United States Patent and Trademark Office*